United States Patent
Podgorny et al.

(10) Patent No.: US 11,734,330 B2
(45) Date of Patent: *Aug. 22, 2023

(54) PROCESSING UNSTRUCTURED VOICE OF CUSTOMER FEEDBACK FOR IMPROVING CONTENT RANKINGS IN CUSTOMER SUPPORT SYSTEMS

(71) Applicant: INTUIT INC., Mountain View, CA (US)

(72) Inventors: Igor A. Podgorny, San Diego, CA (US); Warren Bartolome, Mountain View, CA (US); Kelvin Hung, Mountain View, CA (US); Benjamin Indyk, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 16/800,159

(22) Filed: Feb. 25, 2020

(65) Prior Publication Data

US 2020/0250215 A1 Aug. 6, 2020

Related U.S. Application Data

(63) Continuation of application No. 15/094,653, filed on Apr. 8, 2016, now Pat. No. 10,599,699.

(51) Int. Cl.
  *G06F 16/35* (2019.01)
  *G06F 16/335* (2019.01)
  *G06F 16/33* (2019.01)

(52) U.S. Cl.
  CPC .......... *G06F 16/353* (2019.01); *G06F 16/337* (2019.01); *G06F 16/3344* (2019.01)

(58) Field of Classification Search
  CPC .......... G06F 16/9535; G06F 16/24578; G06F 16/248; G06F 16/24575
  See application file for complete search history.

(56) References Cited

U.S. PATENT DOCUMENTS 5,471,382 A 11/1995 Tallman et al.
5,519,608 A 5/1996 Kupiec
(Continued)

FOREIGN PATENT DOCUMENTS

CN 101520802 A 9/2009
EP 2159715 A2 3/2010
(Continued)

OTHER PUBLICATIONS

Oror, et al., "From Query to Question in One Click: Suggesting Synthetic Questions to Searchers," International World Wide Web Conferences Steering Committee, May 13, 2013, pp. 391-401. Retrieved on Dec. 10, 2018. Retrieved from: http://www2013.w3c.br/proceedings/p391.pdf.

(Continued)

*Primary Examiner* — Apu M Mofiz
*Assistant Examiner* — Cindy Nguyen
(74) *Attorney, Agent, or Firm* — Patterson + Sheridan, LLP

(57) ABSTRACT

Techniques are disclosed for adjusting a ranking of information content presented to a user based on voice-of-customer feedback. In one embodiment, a user may provide feedback on information content presented to the user. Such feedback may be evaluated to identify at least one topic referenced in the received feedback. If an application determines that the at least one topic is related to topics of the information content, the application determines sentiment (Continued)

regarding the information content based on the feedback, and adjusts a ranking of the information content based on the determined sentiment.

20 Claims, 7 Drawing Sheets

(56) References Cited

U.S. PATENT DOCUMENTS

| | | | |
|---|---|---|---|
| 6,147,975 A | 11/2000 | Bowman-Amuah | |
| 6,601,055 B1 | 7/2003 | Roberts | |
| 7,013,263 B1 | 3/2006 | Isaka et al. | |
| 7,222,078 B2 | 5/2007 | Abelow | |
| 7,385,716 B1 | 6/2008 | Skaanning | |
| 7,594,176 B1 | 9/2009 | English | |
| 7,685,144 B1 | 3/2010 | Katragadda | |
| 7,974,860 B1 | 7/2011 | Travis | |
| 8,200,527 B1 | 6/2012 | Thompson et al. | |
| 8,311,792 B1 | 11/2012 | Podgorny et al. | |
| 8,341,167 B1 | 12/2012 | Podgorny et al. | |
| 8,484,228 B2 | 7/2013 | Bhattacharyya et al. | |
| 8,645,298 B2 | 2/2014 | Hennig et al. | |
| 8,660,849 B2 | 2/2014 | Gruber et al. | |
| 8,817,968 B1 | 8/2014 | Boutcher et al. | |
| 8,892,539 B2 | 11/2014 | Anand et al. | |
| 8,909,568 B1 | 12/2014 | Mann et al. | |
| 8,943,145 B1 | 1/2015 | Peters et al. | |
| 8,983,977 B2 | 3/2015 | Ishikawa et al. | |
| 9,015,031 B2 | 4/2015 | Ferrucci et al. | |
| 9,060,062 B1 | 6/2015 | Madahar et al. | |
| 9,063,983 B1 | 6/2015 | Lee | |
| 9,247,066 B1 | 1/2016 | Stec et al. | |
| 9,268,851 B2 * | 2/2016 | Lin | G06F 16/951 |
| 9,336,211 B1 | 5/2016 | Bousquet et al. | |
| 9,336,269 B1 | 5/2016 | Smith et al. | |
| 9,342,608 B2 | 5/2016 | Cook et al. | |
| 9,460,191 B1 | 10/2016 | Gaucher et al. | |
| 9,471,883 B2 | 10/2016 | Chatterjee et al. | |
| 9,582,757 B1 | 2/2017 | Holmes et al. | |
| 9,633,309 B2 | 4/2017 | Giffels et al. | |
| 9,779,388 B1 | 10/2017 | Hansen et al. | |
| 9,887,887 B2 | 2/2018 | Hunter et al. | |
| 9,892,367 B2 | 2/2018 | Guo et al. | |
| 9,910,886 B2 | 3/2018 | Adams, Jr. et al. | |
| 10,002,177 B1 | 6/2018 | McClintock et al. | |
| 10,083,213 B1 | 9/2018 | Podgomy et al. | |
| 10,134,050 B1 | 11/2018 | Hung et al. | |
| 10,147,037 B1 | 12/2018 | Podgomy et al. | |
| 10,162,734 B1 | 12/2018 | Podgomy et al. | |
| 2002/0111888 A1 | 8/2002 | Stanley et al. | |
| 2002/0111926 A1 | 8/2002 | Bebie | |
| 2002/0123983 A1 | 9/2002 | Riley et al. | |
| 2002/0169595 A1 | 11/2002 | Agichtein et al. | |
| 2003/0099924 A1 | 5/2003 | Tsuboi et al. | |
| 2003/0144873 A1 | 7/2003 | Keshel | |
| 2004/0024739 A1 | 2/2004 | Copperman et al. | |
| 2005/0114327 A1 | 5/2005 | Kumamoto et al. | |
| 2006/0085750 A1 | 4/2006 | Easton, et al. | |
| 2006/0265232 A1 | 11/2006 | Katariya et al. | |
| 2007/0011131 A1 | 1/2007 | Delefevre | |
| 2007/0219863 A1 | 9/2007 | Park et al. | |
| 2007/0259325 A1 | 11/2007 | Clapper | |
| 2008/0189197 A1 | 8/2008 | Allanson et al. | |
| 2008/0208610 A1 | 8/2008 | Thomas et al. | |
| 2008/0215541 A1 | 9/2008 | Li et al. | |
| 2008/0294637 A1 | 11/2008 | Liu | |
| 2009/0012926 A1 | 1/2009 | Ishikawa et al. | |
| 2009/0119575 A1 | 5/2009 | Velusamy | |
| 2009/0162824 A1 | 6/2009 | Heck | |
| 2009/0248659 A1 | 10/2009 | McCool et al. | |
| 2009/0253112 A1 | 10/2009 | Cao et al. | |
| 2009/0265340 A1 | 10/2009 | Barcklay et al. | |
| 2009/0319342 A1 * | 12/2009 | Shilman | G06Q 30/02 705/7.41 |
| 2010/0068687 A1 | 3/2010 | Bertelsen | |
| 2010/0070554 A1 | 3/2010 | Richardson et al. | |
| 2010/0076998 A1 | 3/2010 | Podgomy et al. | |
| 2010/0088262 A1 | 4/2010 | Visel et al. | |
| 2010/0185630 A1 | 7/2010 | Cheng et al. | |
| 2010/0191686 A1 | 7/2010 | Wang et al. | |
| 2010/0203492 A1 | 8/2010 | Nibe et al. | |
| 2010/0205550 A1 | 8/2010 | Chen et al. | |
| 2010/0235361 A1 | 9/2010 | Chandran et al. | |
| 2010/0241971 A1 | 9/2010 | Zuber | |
| 2010/0318919 A1 | 12/2010 | Murphy et al. | |
| 2011/0055699 A1 | 3/2011 | Li et al. | |
| 2011/0078167 A1 * | 3/2011 | Sundaresan | G06F 40/30 707/765 |
| 2011/0125734 A1 | 5/2011 | Duboue et al. | |
| 2011/0202472 A1 | 8/2011 | Wan et al. | |
| 2011/0231347 A1 | 9/2011 | Xu et al. | |
| 2011/0264569 A1 | 10/2011 | Houseworth et al. | |
| 2011/0282892 A1 | 11/2011 | Castellani et al. | |
| 2012/0005148 A1 | 1/2012 | Horvitz et al. | |
| 2012/0005219 A1 | 1/2012 | Apacible et al. | |
| 2012/0022983 A1 | 1/2012 | Hughes, Jr. | |
| 2012/0084120 A1 | 4/2012 | Hirsch et al. | |
| 2012/0084185 A1 | 4/2012 | Ciaramitaro et al. | |
| 2012/0084293 A1 | 4/2012 | Brown et al. | |
| 2012/0095976 A1 | 4/2012 | Hebenthal et al. | |
| 2012/0130910 A1 | 5/2012 | Al-Alami | |
| 2012/0130978 A1 | 5/2012 | Li et al. | |
| 2012/0136764 A1 | 5/2012 | Miller et al. | |
| 2012/0166438 A1 | 6/2012 | Wu et al. | |
| 2012/0219142 A1 | 8/2012 | Gould | |
| 2012/0233191 A1 | 9/2012 | Ramanujam | |
| 2012/0331052 A1 | 12/2012 | Rathod | |
| 2013/0019286 A1 | 1/2013 | Barborak et al. | |
| 2013/0054497 A1 | 2/2013 | Garland et al. | |
| 2013/0066693 A1 | 3/2013 | Laird-McConnell et al. | |
| 2013/0073390 A1 | 3/2013 | Konig et al. | |
| 2013/0110823 A1 | 5/2013 | Su et al. | |
| 2013/0111323 A1 | 5/2013 | Taghaddos et al. | |
| 2013/0117677 A1 | 5/2013 | St. Jacques, Jr. | |
| 2013/0282363 A1 | 10/2013 | Fan et al. | |
| 2013/0285855 A1 | 10/2013 | Dupray et al. | |
| 2013/0297553 A1 | 11/2013 | Biemer | |
| 2013/0304730 A1 | 11/2013 | Zhou | |
| 2013/0311455 A1 | 11/2013 | Kritt et al. | |
| 2013/0317891 A1 * | 11/2013 | Grigorash | H04H 60/31 705/12 |
| 2013/0325992 A1 | 12/2013 | McGann et al. | |
| 2013/0339870 A1 | 12/2013 | Tandra Sishtla et al. | |
| 2014/0006012 A1 | 1/2014 | Zhou et al. | |
| 2014/0022328 A1 | 1/2014 | Gechter et al. | |
| 2014/0052606 A1 | 2/2014 | Vasudevan et al. | |
| 2014/0075004 A1 | 3/2014 | Van Dusen et al. | |
| 2014/0088944 A1 | 3/2014 | Natarajan et al. | |
| 2014/0095613 A1 | 4/2014 | Bhardwaj et al. | |
| 2014/0114822 A1 | 4/2014 | Sharma et al. | |
| 2014/0119531 A1 | 5/2014 | Tuchman et al. | |
| 2014/0172883 A1 | 6/2014 | Clark et al. | |
| 2014/0189829 A1 | 7/2014 | McLachlan et al. | |
| 2014/0195613 A1 | 7/2014 | Ogilvie | |
| 2014/0201045 A1 | 7/2014 | Pai et al. | |
| 2014/0222669 A1 | 8/2014 | Novak et al. | |
| 2014/0280070 A1 | 9/2014 | George et al. | |
| 2014/0308648 A1 | 10/2014 | Jain | |
| 2014/0316856 A1 | 10/2014 | Williams et al. | |
| 2014/0324856 A1 | 10/2014 | Lahiani et al. | |
| 2014/0337257 A1 | 11/2014 | Chatterjee et al. | |
| 2014/0372980 A1 | 12/2014 | Verma et al. | |
| 2015/0046371 A1 | 2/2015 | Leary | |
| 2015/0052087 A1 | 2/2015 | Srinivasan et al. | |
| 2015/0058380 A1 | 2/2015 | Polonsky et al. | |
| 2015/0088608 A1 | 3/2015 | Cama et al. | |
| 2015/0095267 A1 | 4/2015 | Behere et al. | |
| 2015/0120718 A1 | 4/2015 | Luo et al. | |
| 2015/0127587 A1 | 5/2015 | Pinckney et al. | |
| 2015/0139415 A1 | 5/2015 | Skiba et al. | |
| 2015/0229531 A1 | 8/2015 | O'Sullivan et al. | |
| 2015/0254785 A1 | 9/2015 | Yang et al. | |
| 2015/0286710 A1 | 10/2015 | Chang et al. | |

(56) References Cited

U.S. PATENT DOCUMENTS

| | | |
|---|---|---|
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048768 A1 | 2/2016 | Liu |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0103833 A1 | 4/2016 | Sanders et al. |
| 2016/0148222 A1 | 5/2016 | Davar et al. |
| 2016/0148321 A1 | 5/2016 | Ciaramitaro et al. |
| 2016/0180470 A1 | 6/2016 | Mascaro et al. |
| 2016/0189029 A1 | 6/2016 | Giffels et al. |
| 2016/0196497 A1 | 7/2016 | Allen et al. |
| 2016/0217472 A1 | 7/2016 | Podgorny et al. |
| 2016/0283491 A1 | 9/2016 | Lu et al. |
| 2016/0299980 A1 | 10/2016 | Saini |
| 2016/0306846 A1 | 10/2016 | Adams, Jr. et al. |
| 2016/0314200 A1 | 10/2016 | Markman et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0124174 A1* | 5/2017 | Starr .................. G06F 16/353 |
| 2017/0124184 A1 | 5/2017 | Podgorny et al. |
| 2017/0270159 A1 | 9/2017 | Wang et al. |
| 2017/0323233 A1 | 11/2017 | Bencke et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2019/0018692 A1 | 1/2019 | Indyk et al. |
| 2019/0018899 A1 | 1/2019 | Podgorny et al. |

FOREIGN PATENT DOCUMENTS

| | | |
|---|---|---|
| JP | 2014112316 A | 6/2014 |
| WO | 2011053830 A2 | 5/2011 |

OTHER PUBLICATIONS

Get Satisfaction [online]. Sprinklr, 2017 [retrieved on Dec. 6, 2018]. Retrieved from the Internet: <URL: https://getsatisfaction.com/corp>.

The Scientific Marketer, "Uplift Modelling FAQ", article date of Sep. 27, 2007, retrieved from http://scientificmarketer.com/2007/09/uplift-modeling-faq.html (Year: 2007).

Zadeh, Z.: "Probabilistic Modeling in Community-Based Question Answering Services," Dalhousie University, Halifax, Nova Scotia; Feb. 2012. Retrieved on Dec. 10, 2018. Retrieved from: https://www.cs.ubc.ca/~zolaktaf/ZolaktafZadeh, Zeinab, MCS, CS, Apr. 2012.pdf.

Podgorny, et al. "Real Time Detection and Intervention of Poorly Phrased Questions," CHI EA'15, Proceedings of the 33rd Annual ACM Conference Exteneded Abstracts on Human Factors in Computing Systems, Apr. 18-23, 2015, Seoul, Republic of Korea, pp. 2205-2210.

Podgorny, et al., "Content Quality and User Ranking in Turbo Tax AnswerXchange," Proceedings of the European Conference on Social Media, University of Brighton UK, Jul. 10-11, 2014.

Podgorny, Igor A. et al., "Proceedings of the European Conference on Social Media", University of Brighton UK, Jul. 10-11, 2014.

Dror, et al., "From Query to Question in One Click: Suggesting Synthetic Questions to Searchers," International World Wide Web Conferences Steering Committee, May 13, 2013, pp. 391-401.

Bartolome et al., "Processing Unstructured Voice of Customer Feedback for Improving Content Rankings in Customer Support Systems," U.S. Appl. No. 15/094,653, filed Apr. 8, 2016.

The Scientific Marketer, "Uplift Modeling FAQ", article date of Sep. 27, 2007, retrieved from http://scientificmarketer.com/2007/09/uplift-modeling-faq.html (Year: 2007).

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA'15, Proceedings of the 33rd Annual ACM Conference Extended Abstracts on Human Factors in Computing Systems, Apr. 18-23, 2015, Seoul, Republic of Korea, pp. 2205-2210.

* cited by examiner

PROCESSING UNSTRUCTURED VOICE OF CUSTOMER FEEDBACK FOR IMPROVING CONTENT RANKINGS IN CUSTOMER SUPPORT SYSTEMS

CROSS REFERENCE TO RELATED APPLICATIONS

This application is a continuation of and hereby claims priority under 35 U.S.C. § 120 to pending U.S. patent application Ser. No. 15/094,653, filed on Apr. 8, 2016, the contents of which are incorporated herein by reference in their entirety.

FIELD

The present disclosure relates to techniques for improving the accuracy or usefulness of content rankings of application content in real-time based on feedback from users.

BACKGROUND

Complex software applications and services are frequently made available to users over computer networks, such as the Internet. For example, software applications used to prepare and file income tax returns are frequently offered as an online service. In addition to generating tax return documents, these online services typically guide a user through a collection of complex interactive workflows in order to prepare a complete, valid income tax return.

Other online services allow users to access software applications used to prepare a variety of other legal and formal documents. For example, online services are available which direct a user through a guided interaction to generate estate planning documents, corporate entity documents, legal filings, etc. Still other complex software applications accessed as an online service include financial service applications which allow users to complete mortgage applications or apply for home, life, or automobile insurance.

In addition to these primarily transactional online services, a variety of complex software tools offer users access to both online services and local client applications, e.g., financial accounting software, video editing or media composition software, software development tools, etc. Such applications may allow users to access application features and user data stored online, regardless of whether the application is installed locally by an end user or accessed as an online service. Once customer data is stored by a service provider, end users can access their data using a variety of clients, including a web browser used to access a software application as a series of web pages, dedicated "thin" client applications, and so-called "apps" accessed using a mobile telephone or computing tablet.

Service providers often publish help content, user guides, and other documentation to assist users in accomplishing a given task, explain a given feature, or describe information related to the service (e.g., the requirements a user must satisfy to qualify for a given tax credit or the consequences of different choices or elections a user can make in filing a tax return). In addition, service providers often host online forums or communities where users can post questions, comments, and guides related to the features, use, or purpose of an online service, as well as respond to questions or comment on posts submitted by other users. For popular applications and services, user generated content can become a significant source of information and insight about a software application and related topics.

SUMMARY

One embodiment presented herein includes a method for adjusting a ranking of information content of a software application presented to a user based on voice-of-customer feedback. The method generally includes receiving feedback regarding a content item presented to a user. The method also includes identifying at least one topic referenced in unstructured text content included in the feedback. The method further includes upon determining that the at least one topic is related to at least one topic associated with the content item, determining a user sentiment regarding the content item by evaluating either the unstructured text content or additional feedback providing an indication of user experience relative to the content item, and adjusting a ranking of the content item based on the determined sentiment.

In one aspect, the additional feedback includes either an up or down vote or a star rating that indicates whether the user approves or disapproves of the content item. In one aspect, a selection of search results that include the content item are presented to at least another user. A position of the content item within the selection of the search results is based on the adjusted ranking.

Additional embodiments include a system having a processor and a memory storing one or more application programs configured to perform the methods disclosed herein and a computer-readable storage medium storing instructions, which when executed on a processor perform the methods disclosed herein.

DETAILED DESCRIPTION

Figure 1:
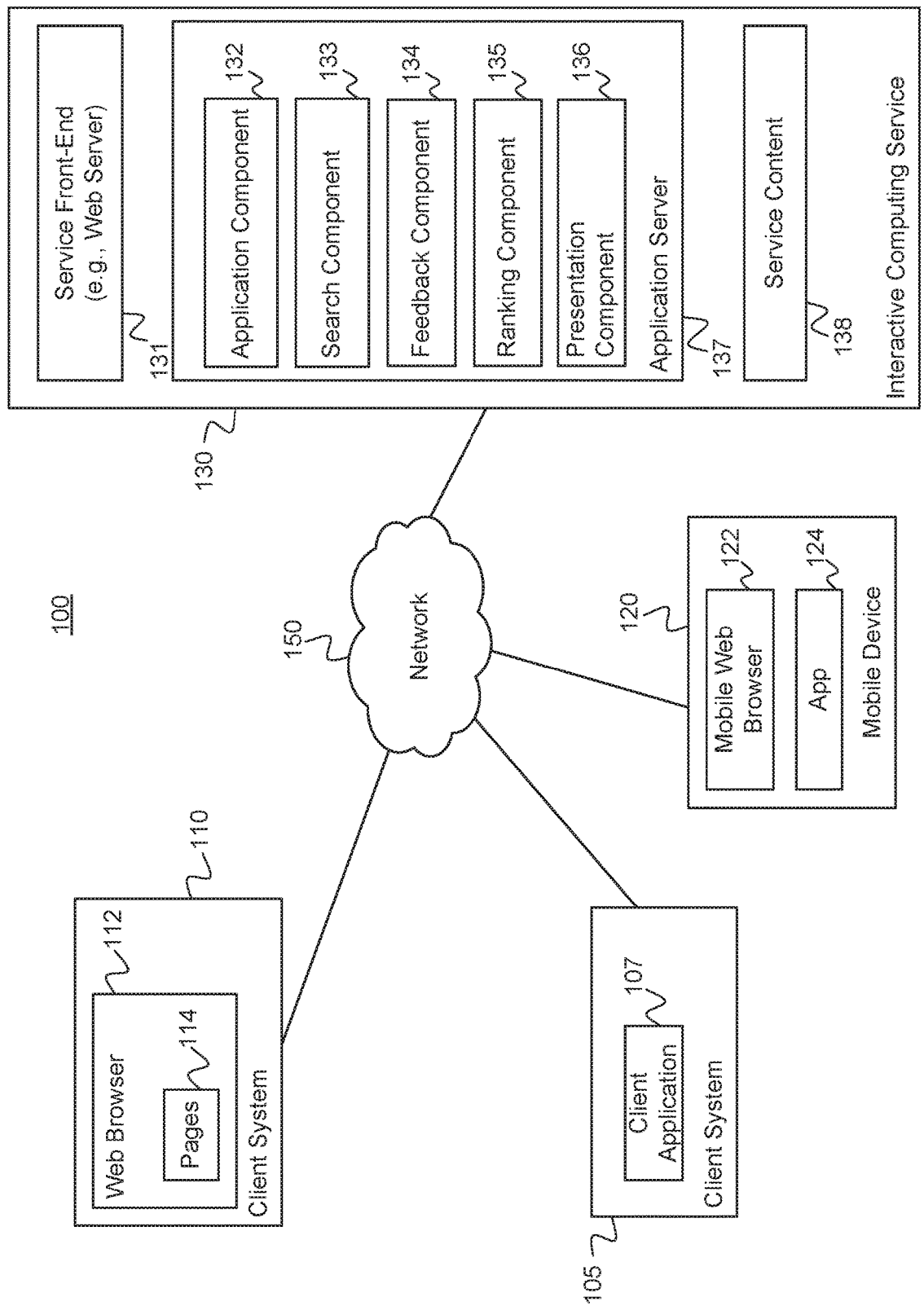
FIG. 1 illustrates an example of a computing environment used to provide an interactive computing service, according to one embodiment.

Embodiments presented herein provide techniques for improving quality of content rankings for information content and/or presentation of information content, based on user feedback, sometimes referred to as "voice-of-customer" feedback.

For example, software applications or online services may prompt users for voice-of-customer feedback regarding the usefulness or quality of information content (e.g., self-support content, assisted support content, etc.). Self-support content, in particular, may include information content (or content items) such as help content, user guides, documentation, user generated content, etc., that aids a user in interacting with the software application or online service. Using an online tax preparation service as a reference example, self-support content for such a service may allow users to search for help content, user guides, etc., related to a particular topic (such as the requirements needed to qualify for a given tax credit). Assisted support content, typically provided when a customer interacts with a support agent, can provide additional assistance to users. For example, users can receive assisted support via chat rooms, technical support calls, and the like, to accomplish a particular task. Examples of assisted support content include forum posts, chat rooms, and the like, where the user typically receives additional assistance regarding a particular task.

In one embodiment, software applications and online services may prompt users for structured feedback. For example, a user may provide structured feedback in the form of up or down votes (or yes/no answers) to indicate whether that particular user was satisfied or dissatisfied with information content presented to the user while interacting with the online service. As another example, online services often use a star rating system (or other scale) to allow users to provide structured feedback characterizing the quality or usefulness of information content (e.g., in a five star rating system, five stars may indicate the highest quality). Assuming a user was presented with a frequently asked question (FAQ) in response to the user's search query, the online service could prompt the user to indicate "yes" or "no" to one or more questions related to the quality of the FAQ. Such questions may relate to whether the FAQ was written well, whether the FAQ was relevant to the user's search query, etc. In this manner, the online service can determine the user's sentiment regarding information content presented to the user.

In some cases, however, structured feedback may not provide an accurate measure of user sentiment regarding quality or usefulness of information content. For example, when providing structured feedback (e.g., binary up/down votes, star ratings, etc.), users may (intentionally or unintentionally) confuse their experience related to the usefulness of information content (e.g., self-support content) provided by the software application or online service with other subjective and/or emotional factors that are unrelated to the self-support content. Continuing with the tax preparation example, a user may (intentionally or unintentionally) confuse their experience with self-support content that helps the user determine whether the user qualifies for a given tax credit with their experience with the tax preparation service itself (e.g., such as cost of the service, amount of tax refund determined by the service, etc.), their experience with the Internal Revenue Service (IRS), or other subjective criteria unrelated to the quality or usefulness of the self-support content. As a result, online services generally do not adjust rankings of information content based solely on structured feedback.

At the same time, online services may prompt users for more detailed (unstructured) voice-of-customer feedback about their experience interacting with a software application or online service. For example, users may provide user comments, product reviews, exit surveys, etc., regarding quality or usefulness of the information content. Compared to structured feedback, unstructured feedback may provide a more express indication of user sentiment regarding the quality of the information content. In particular, users can specify whether the information content was relevant or helpful and provide reasons why the content was relevant or helpful. Similarly, users can specify whether the self-support content was not relevant or unhelpful and explain why the information was not helpful.

However, analyzing unstructured feedback is generally an inefficient and cost-intensive process. Specifically, online services have to invest substantial human costs and time in order to read, interpret, and evaluate each piece of unstructured feedback. As a result, evaluating such feedback in real-time in order to improve rankings of information content and/or presentation of information content for other users may not be feasible.

Examples presented herein provide techniques for determining an accurate measure of user sentiment regarding the usefulness or quality of information content. More specifically, examples presented herein integrate structured feedback and unstructured voice-of-customer (VOC) feedback in real-time to provide a more express indication of user sentiment regarding information content presented to the user while interacting with the online service. Once determined, the sentiment can be used to improve how information content is presented to other users (e.g., by adjusting the ranking for the information content based on the sentiment).

In one example, the online service may include a ranking feature that uses unstructured feedback provided by a given user to separate bias of the user that may be present in the feedback they provide for information content presented to the user. For example, the online service may evaluate the unstructured voice-of-customer feedback using natural language processing to identify one or more topics referenced in the voice-of-customer feedback. The ranking feature can classify (or separate) the one or more topics into different categories depending on the particular content each topic is related to. For example, if the ranking feature determines that a topic is related to quality and/or usefulness of a piece of information content, then that topic may be considered when ranking the information content. On the other hand, if the ranking feature determines that a topic is related to the criticism of the application or service itself or is related to other types of information content (e.g., assisted support content), then such topics may not be considered as relevant when ranking the information content. Identifying relevant topics in the voice-of-customer feedback in this manner allows an online service to separate the potential bias that may be present in feedback provided by the user and allows the online service to improve the presentation of information content (e.g., self-support content) for other users that may use the online service.

As another example, assume a user accessing an online tax-preparation service is provided with help content, such as user guides, user-generated content, etc., regarding a particular topic (e.g., such as how to prepare a tax return). Further assume that when prompted for feedback regarding the usefulness of such information content, the user votes down the information content and provides a comment that criticizes the application or service. According to one example, the ranking feature in this situation would determine, based on topics that are identified in the comment (criticizing the service), that the down vote is most likely biased (or at least not a measure of information quality in the help content). Based on this determination, the ranking feature could reduce the impact of the down vote on the ranking of the help content presented to the user. In this manner, the help content would retain its likelihood of being presented to other users of the online service (e.g., that want information regarding how to prepare a tax return). Likewise, if the ranking feature were to determine that the topics referenced in the feedback were relevant to the quality of the help content, the ranking feature would use the feedback to adjust the ranking of the help content to increase or reduce the likelihood of such content being presented to other users of the online service.

In one example, the unstructured voice-of-customer feedback may be evaluated using a probabilistic topic model (e.g., a Latent Dirichlet Allocation (LDA) model, a correlated topics model (CTM), etc.) generated from a content repository associated with the online service. The content repository may include content items associated with self-support content (e.g., help articles, user guides, forum posts or other user-generated content, etc.), assisted support content (e.g., such as references to chat boards, and contact information for customer service assistants), and other information. The probabilistic topic model may have been trained over the content items in the content repository hosted by the online service. In addition to documents from the content repository, the training data may also include a collection of voice-of-customer feedback that does not directly reference topics in the content repository (e.g., feedback that simply criticizes the online service). The probabilistic topic model may evaluate the unstructured voice-of-customer feedback to identify a set of topics referenced by the voice-of-customer feedback and metadata for each topic. The metadata may provide a probability (or measure of confidence) that a given topic is actually referenced in the feedback. As described below, the metadata can be used to separate the topics into different categories (e.g., content related to the application or service, self-support content, assisted support content), based on how much the topic relates to any given category.

According to some examples, the application or online service may also identify topics that are trending (e.g., one or more areas of interest that appear to be developing) based on voice-of-customer feedback provided by groups of users of the application or online service. In one case, for example, VOC feedback (from a group users) regarding information content may express approval of that content (e.g., "This post on ordinary and necessary business expenses is fantastic!"). Based on this VOC feedback, the online service may identify one or more topics (e.g., "taxing," "deductions", "business expenses") and sentiment (e.g., "fantastic") and determine that the particular topics are "trending". The online service can select information content that is presented to other users based on the identified "trending" topics. For example, the online service can prioritize (e.g., by adjusting a ranking of the) information content that includes the "trending" topics. Similarly, in one case, VOC feedback (from a group of users) regarding information content may express disapproval of the information content (e.g., the information content may be missing, the information content may not have addressed the user's question, etc.). Based on the VOC feedback, the online service can identify the relevant topics, sentiment, and select information content based on the identified trends.

Once the trending topics are identified, the application or online service can proactively identify information content that reflects the "trending" topics and present such information content to users of the online service, in advance of any support interaction with the online service by the users. For example, assume that one or more users interacting with an online tax-preparation service provide similar voice-of-customer feedback regarding a particular topic (e.g., whether time extensions exist for filing a tax return, etc.). In one example, the online service may use an aggregation tool to monitor and collect feedback from a group of users regarding the quality or usefulness of such content and/or feedback from a group of users regarding whether such information can be found in the self-support content provided by the online service. For example, if the online service determines that most of the topics being referenced in voice-of-customer feedback from one or more users relate to concerns regarding time extensions for tax returns, the online service can proactively select information content that appears to the entire user community (e.g., on a homepage associated with the service) in order to present the time extension information (e.g., as opposed to content that references other topics). In this manner, the techniques presented herein can dynamically improve users' experience with an online service, e.g., by proactively identifying and presenting relevant content to users in advance of those users using the application or online service to search for the particular content.

Embodiments of the disclosure are described herein using an online tax-preparation service and related online user communities as an example of computer software, software interfaces, etc., that may rank and/or present information content (used to help users in accomplishing a particular task) based on voice-of-customer feedback. One of ordinary skill in the art will recognize that the approaches for ranking and/or presenting information content based on voice-of-customer feedback may be adapted for use by a broad variety of software applications, online or web services, and software features.

FIG. 1 illustrates an example of a computing environment 100 used to provide an interactive computing service 130, according to one embodiment. As shown, the computing environment 100 includes client systems 105, 110, a mobile device 120, and an interactive computing service 130, which are each connected to a network 150. The network 150, in general, may be a wide area network (WAN), local area network (LAN), wireless LAN (WLAN), personal area network (PAN), a cellular network, etc. In a particular embodiment, the network 150 is the Internet.

Client systems 105, 110 are included to be representative of a general purpose computing system, such as a desktop or laptop computer hosting applications used to access the interactive computing service 130. For example, client system 110 includes web browser 112 used to access the interactive computing service 130 by rendering web pages 114 received from the interactive computing service 130. Similarly, client system 105 includes a client application 107. The client application 107 is included to be representative of a component of a client server application (or other distributed application) which can communicate with the interactive service 130 over network 150. Client application 107 may be a "thin" client where the processing is largely directed by the client application 107, but performed by computing systems of the interactive computing service 130 or a conventional software application installed on client system 105. Mobile device 120 is included to be representative of a variety of computing devices, such as a mobile telephone or computing tablet. As shown, the mobile device 120 may access the interactive computing service 130 over network 150 using a mobile web browser 122 or local application or "app" 124 executed on the mobile device 120.

In one embodiment, web browsers 112, 122, client application 107, and app 124 communicate with the interactive computing service 130. For example, in the case where interactive computing service 130 offers a tax-preparation service, web browsers 112, 122, client application 107, and app 124 may provide software which guides a user through preparing a tax return as well as provide users with access to a variety of related features (e.g., self-support content, assisted support content, etc.) available from the interactive computing service 130. Continuing with the tax preparation example, such features may include the ability to file a prepared return, to search for help content, user generated content, etc. related to tax topics, to post questions and answers to questions about the service using an online community, or to provide feedback about the usefulness, quality or relevance of content provided by the interactive application or members of the online community. As described herein, in one embodiment, structured feedback and/or unstructured voice-of-customer feedback characterizing a user experience with particular information content may be used to improve the ranking and/or presentation of information content for other users.

As shown, the interactive computing service 130 includes a service front-end 131, an application server 137, and a service content database 138. In this example, the interactive computing service 130 is generally modeled as a web server (i.e., service front end 131), an application server 137, and a database (i.e., service content database 138). Of course, other software architectures or distributed application frameworks could be used. Service front-end 131 and application server 137 are included to be representative of physical computing systems, as well as representative of virtual machine instances deployed to a computing cloud. Service front end 131 may communicate with application server 137 to respond to requests from applications on client systems 105, 110, and mobile device 120.

The application server 137 includes an application component 132, search component 133, feedback component 134, ranking component 135 and presentation component 136. Continuing with the example of a tax preparation service, the application component 132 may provide one or more software applications which are used to guide a user in preparing a tax return and to access related features and services, e.g., to interact with self-support content or assisted support content. In one embodiment, the application component 132 may respond to requests from clients by generating hypertext markup language (HTML) and related content passed to clients via the service front-end 131. In some embodiments, the application 107 running on the client 105 and/or the application 124 running on the mobile device 120 could generate information content to present data retrieved from the application server 137. In general, the application component 132 may be implemented using any suitable software programming language, application framework, web service solution stack, virtual application containers, etc., in order to present application features and content to a user.

In some embodiments, the application server 137 may include one or more graphical user interface (GUI) components that interactive computing service 130 can present on client systems 105, 110 and mobile device 120, based on whether a user is interacting with a workflow (via application component 132), searching for information content (e.g., via search component 133), providing feedback for information content (e.g., via feedback component 134), etc. The GUI components may include, for example, HTML components or code that generates HTML components that can be passed to client systems 105, 110 and mobile device 120 and rendered as a user interface. The GUI components may additionally include instructions executable by client systems or mobile devices to display a user interface. The GUI components may additionally include instructions executable by client systems 105, 110 and mobile device 120 to display a user interface using language-specific or operating system-specific GUI components (e.g., instructions for displaying Win32 forms or similar components on other operating system platforms, Abstract Window Toolkit or Swing API components on the Java platform, and so on). Generally, instructions capable of rendering a GUI on client systems 105, 110 and mobile device 120 may include computer executable code generated from compiling and/or interpreting C (or variants thereof), Java, PHP, Ruby, HTML, javascript, Python, AJAX, VBscript, and other programming or scripting languages used to compose and present a GUI. In an example tax preparation application, application server 137 components may include screens for prompting a user for personal information (e.g., name, address, social security number), income information (from W-2s, 1099s, K-1 s, and so on), and various deductions and credits that the user may qualify for, structured feedback (e.g., up-down votes, star ratings, etc.), voice-of-customer feedback, etc.

The search component 133 may be used to allow users to search for content items or features available from the interactive computing service 130. For example, the search component 133 may evaluate service content database 138 to identify content items responsive to a user query. In such a case, the search component 133 could identify a variety of content items or services hosted on the interactive computing service 130, such as user guides, feature documentation, as well as user generated content such as questions posted to an online community of users, user blogs, or syndicated forum posts, etc. In some cases, the search component 133 may use keywords specified in the user query to identify content hosted on the interactive computing service 130. For example, assume a user specifies keywords "tax return" in a search for how to prepare a tax return. In response, the search component 133 may identify content items in the server content database 138 that include the keywords "tax return" specified by the user and present a ranked list of such content items to the user. As described in more detail below, the interactive computing service 130 may prompt the user for feedback regarding the quality and/or usefulness of a content item selected from the list of content items presented to the user. Based on whether the feedback was relevant or not to the quality of the information content presented to the user), the interactive computing service 130 may adjust the order of content items in the ranked list for other users of the interactive computing service 130.

The feedback component 134 may be used to capture feedback regarding user experience. For example, a user presented with particular information content responsive to a user query may be prompted to provide structured feedback (e.g., binary up/down votes, star ratings, etc.) regarding the quality and/or usefulness of the information content. In some examples, the user may also be prompted to provide more detailed (unstructured) voice-of-customer feedback to describe the quality and/or usefulness of the information content. In turn, the feedback component 134 may evaluate such unstructured voice-of-customer feedback using natural language processing techniques to identify what topics are referenced in the voice-of-customer feedback. As described in more detail below, the ranking component 135 and/or presentation component 136 may use such feedback to enhance the ranking and/or presentation of information content for users of the online service.

The ranking component 135, for example, may integrate structured feedback with unstructured feedback (as opposed to using only structured feedback) to determine a more express indication of user sentiment regarding the user's experience with an online service or regarding some item of help content (including user-generated content). For example, in the case of self-support content (e.g., such as tax questions and answers posted by users of an online tax preparation service) that may be presented to users to aid users in accomplishing a given task (e.g., determining requirements for qualifying for a tax credit), the ranking component 135 may use voice-of-customer feedback to determine whether there is potential bias in a user's feedback, and adjust the impact that the particular feedback has on a ranking for the information content based on whether there is bias in the feedback. In some cases, the feedback provided by a user can be processed separately or weighted differently depending on where it was collected. In the computing environment 100, for example, the ranking component 135 may evaluate feedback collected from the mobile device 120 differently than feedback collected from client systems 105 and 110.

The presentation component 136 may be used to select and present information content based on the adjusted rankings. For example, if the ranking for a particular content item has been decreased, the presentation component 136 can reduce the likelihood that the content item will be presented to other users and/or adjust where the content item appears in a list of search results (e.g., a position of the content item in a selection of search results) presented to other users responsive to a search query. Referring to one reference example with five pages of search results, instead of the content item appearing as the first result on page one of the search results presented to the user, the content item may now appear as the third result on page five of a list of search results returned to other users. Similarly, if the ranking for a particular content item has been increased, the presentation component 136 can increase the likelihood that the content item will be presented to other others and/or where the content item appears in a list of information content presented to other users. In some examples, the presentation component 136 may also use voice-of-customer feedback to proactively identify "trending" topics that may be of interest to a group of users of the online service (e.g., a tax preparation service). Once identified, the presentation component 136 can identify and present information content that reflects the trending topics to other users, in advance of those users searching for content that includes the trending topics.

Figure 2:
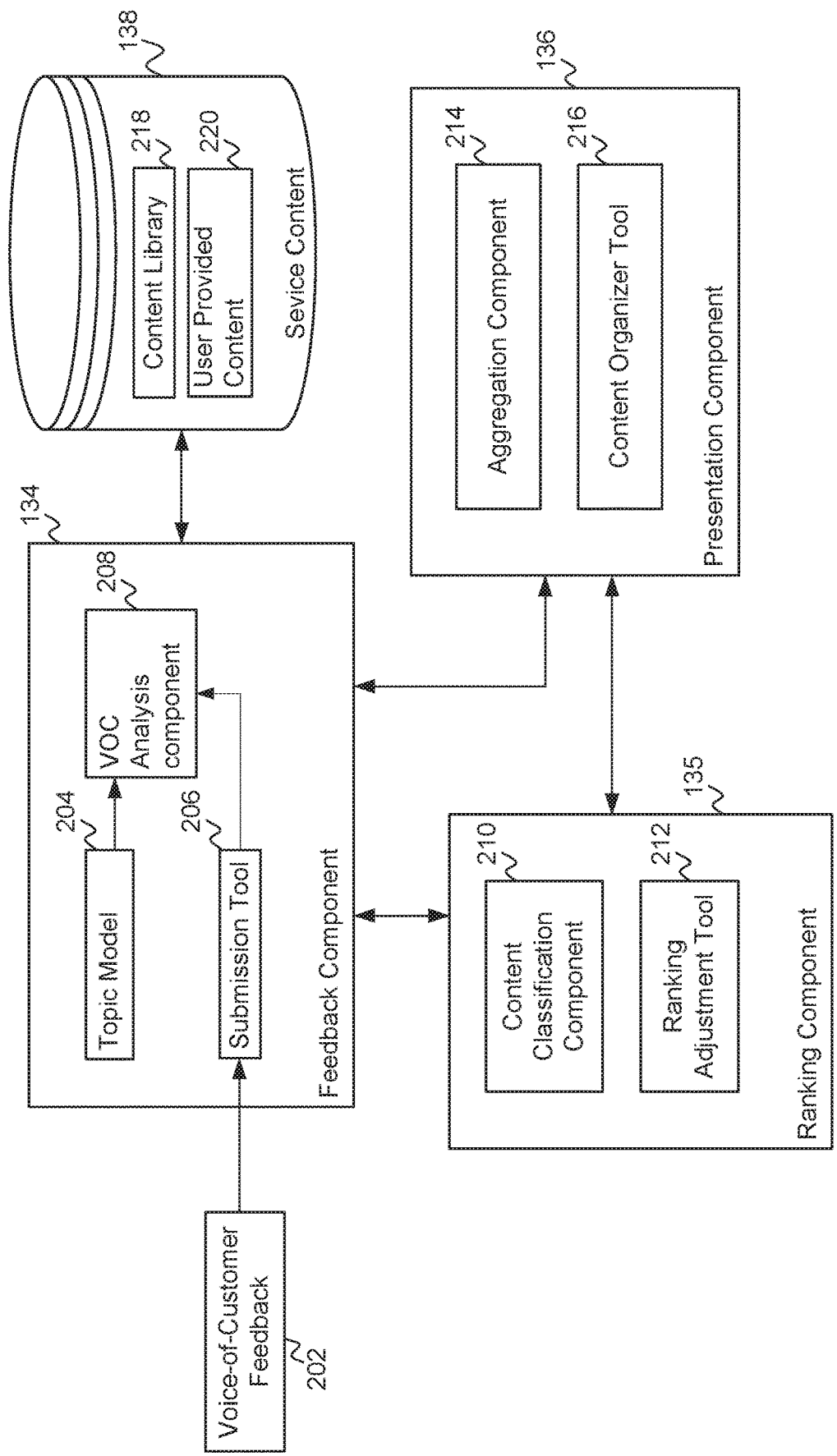
FIG. 2 illustrates components of the interactive computing service used to adjust rankings of information content based on voice-of-customer feedback, according to one embodiment.

FIG. 2 further illustrates components of the interactive computing service 130 described relative to FIG. 1, according to one embodiment. As shown, the feedback component 134 interacts with service content database 138 to analyze voice-of-customer feedback 202 in real-time. The feedback component 134 also interacts with the ranking component 135 and presentation component 136 to adjust rankings and/or presentation of information content based on the feedback 202.

The feedback component includes a topic model 204, a submission tool 206, and a voice-of-customer (VOC) analysis component 208. As noted above, in response to receiving a search query (e.g., via the search component 133) for particular content or features provided by the interactive computing service 130, the interactive computing service 130 may evaluate content library 218 and user-generated content 220 to identify content responsive to the search query. For example, if the search query is for information regarding "itemized deductions," the interactive computing service 130 may return documents such as user guides, user-generated content, etc. that include the phrase "itemized deductions."

The interactive computing service 130 may prompt the user to provide voice-of-customer feedback 202 regarding the usefulness or quality of the information content presented to the user in response to the search query. In one embodiment, the feedback component 134 prompts the user for structured feedback and/or unstructured feedback via the submission tool 206. In situations where unstructured feedback is received via the submission tool 206, the submission tool 206 may evaluate the feedback 202 using the VOC analysis component 208 and the topic model 204. That is, the VOC analysis component 208 evaluates the feedback 202 relative to the topic model 204 to identify a set of one or more topics believed to be referenced in the feedback 202. The topic model 204 provides a statistical model which can identify a set of topics referenced in the feedback 202 (and a relative measure of how much of the feedback may be about a given topic). For example, for a particular set of feedback received from a user, the topic model 204 could predict that 80% of the feedback is related to a tax filing status and 20% related to another topic. The VOC analysis component 208 can also evaluate the voice-of-customer feedback 202 to determine user sentiment regarding information content. For example, the VOC analysis component 208 can evaluate unstructured text content included in the feedback 202 using natural language processing techniques to determine a quality of user experience relative to the information content presented to the user.

The topic model may be built relative to an underlying set of data hosted on the interactive computing service 130. Such data may include documents, user guides, etc., in content library 218 as well as user generated content 220 in service content database 138. Generally, a "topic" may be represented as a cluster of words that occur together frequently in documents (or other items) in the service content database 138. The label for a topic may be assigned by a subject matter expert or selected as one of the keywords in a given topic. For example, different clusters of words may be presented to a subject matter expert. The subject matter expert may evaluate the clusters of words and assign a topic to each cluster. For example, the subject matter expert could determine that a first cluster of words relates to "spousal privilege," a second cluster of words relates to "student loans," a third cluster of words relates to "capital gains," and so on. Once a topic is assigned to various different clusters of words, the topic model may be built by analyzing clusters of words in documents (and other items) in the content database 138, and labeling the clusters in each document with respective topics. Using the above example, if the first cluster of words is found in the documents, these words would be labeled with the topic "spousal privilege," and so on. In some cases, a given cluster of words in the documents (of content database 138) may be related to multiple different topics, and therefore be assigned different percentages for the different topics. Continuing with the above example, if a given cluster of words relates to "spousal privilege and student loans", this cluster of words might be labeled as 60% related to "spousal privilege" and 40% related to "student loans", or some other percentage based on how much of the cluster of words relates to a given topic. In a particular embodiment, topic model 204 is a LDA model generated from the service content database 138. However, other probabilistic topic models, e.g., such as the correlated topics model, etc., may be used. Additionally, as the content in service content database 138 changes over time, the topic model 204 may be regenerated at times determined by the service provider.

As shown, the ranking component 135 includes a content classification component 210 and a ranking adjustment tool 212. Once the VOC analysis component 208 identifies a set of topics, the content classification component 210 may classify the one or more topics into different categories depending on the type of content associated with each topic. The different categories may be determined based on topics of the content items in the content database 138. For example, the topic model 204 can be used to identify topics in content database 138 related to self-support content, assisted-support content, product-related content, and so on. Once the categories are determined, the content classification component 210 can compare the topics referenced in the feedback 202 to the topics in each category to determine which category each topic belongs to.

For example, assume the VOC analysis component 208 identifies three topics (topic A, topic B, topic C) referenced in the feedback 202. The content classification component 210 may determine topic A is related to the user's experience with the application or online service, topic B is related to the user's experience with assisted support content, and topic C is related to the user's experience with self-support content. In some cases, the content classification component may use the metadata associated with each topic to determine the particular categories in which each topic belongs. Identifying topics, via the topic model 204, and classifying the topics, via the content classification component 210, according to their related content in this manner allows the online service to separate potential bias in structured feedback provided by the user. For example, assume a user were to down vote a piece of self-support content and provide a comment characterizing the self-support content. If the online service (via the topic model 204) were to identify two of the above three topics (topic A and topic B) in the user comment, the online service (via the content classification component 210) would determine that the user comment was most likely biased since neither topic A nor topic B relate to self-support content.

The ranking component 135 can use the ranking adjustment tool 212 to adjust the ranking of the information content that was presented to the user based on the feedback that is related to the quality and/or usefulness of the information content. For example, the ranking component 135 can use the VOC analysis component 208 to determine a sentiment regarding such information content from the content of the feedback 202. Continuing with the example with three topics, the ranking adjustment tool 212 can adjust the impact that each of the topics has on the ranking of the information content, e.g., by applying different weights to each of the different topics. In one case, the ranking adjustment tool 212 can choose to consider content referenced by topic C and not consider topic A and topic B content, since topic C content is related to the user's experience with self-support content. For example, the ranking adjustment tool 212 could apply a weight of zero (or smaller weights) to topics A and B, while applying a non-zero weight (or large weight) to topic C. However, in general, the ranking adjustment tool 212 can use other metrics (normalization functions, biases, etc.) to determine how to weigh each piece of feedback content. In some examples, these other metrics could be based on the percentage of down votes associated with the information content, the length of the information content, whether the information content posed another question to the user (e.g., instead of addressing the user's concern), amount of feedback (e.g., content with a thousand up-votes may carry more weight that content with two up-votes), and the like.

In one embodiment, the content organizer tool 216 can interact with the aggregation component 214 to proactively identify and present information content that may be of interest to multiple users of the online service. The aggregation component 214 can monitor topics referenced in voice-of-customer feedback provided by multiple users and identify whether there are topics that are referenced more often than other topics. Continuing with the tax preparation example, the aggregation component 214 may identify, within the voice-of-customer feedback, several topics that reference "student loan interest deductions." Based on the voice-of-customer feedback, the aggregation component 214 may determine that such a topic is a "trending" topic. Once the aggregation component 214 determines the "trending" topic, the content organizer tool 216 can identify content items (e.g., documents, user-generated content, etc.) within the content database 138 that reference the "trending" topic. In some cases, the identification of the relevant content items that reference "student loan interest deductions" may be based on prior voice-of-customer feedback regarding the content items. That is, the content organizer tool 216 may select content items that have the highest ranking (which may have been adjusted based on prior voice-of-customer feedback from a user that presented with the content items). Once the content organizer tool 216 identifies the relevant content items that reference "student loan interest deductions," the content organizer tool 216 can proactively present the content items to other users to improve the other users' experience in interacting with the online service. Such proactive information content may be presented on an initial search (or home) page, "trending" topics section, etc.

Figure 3:
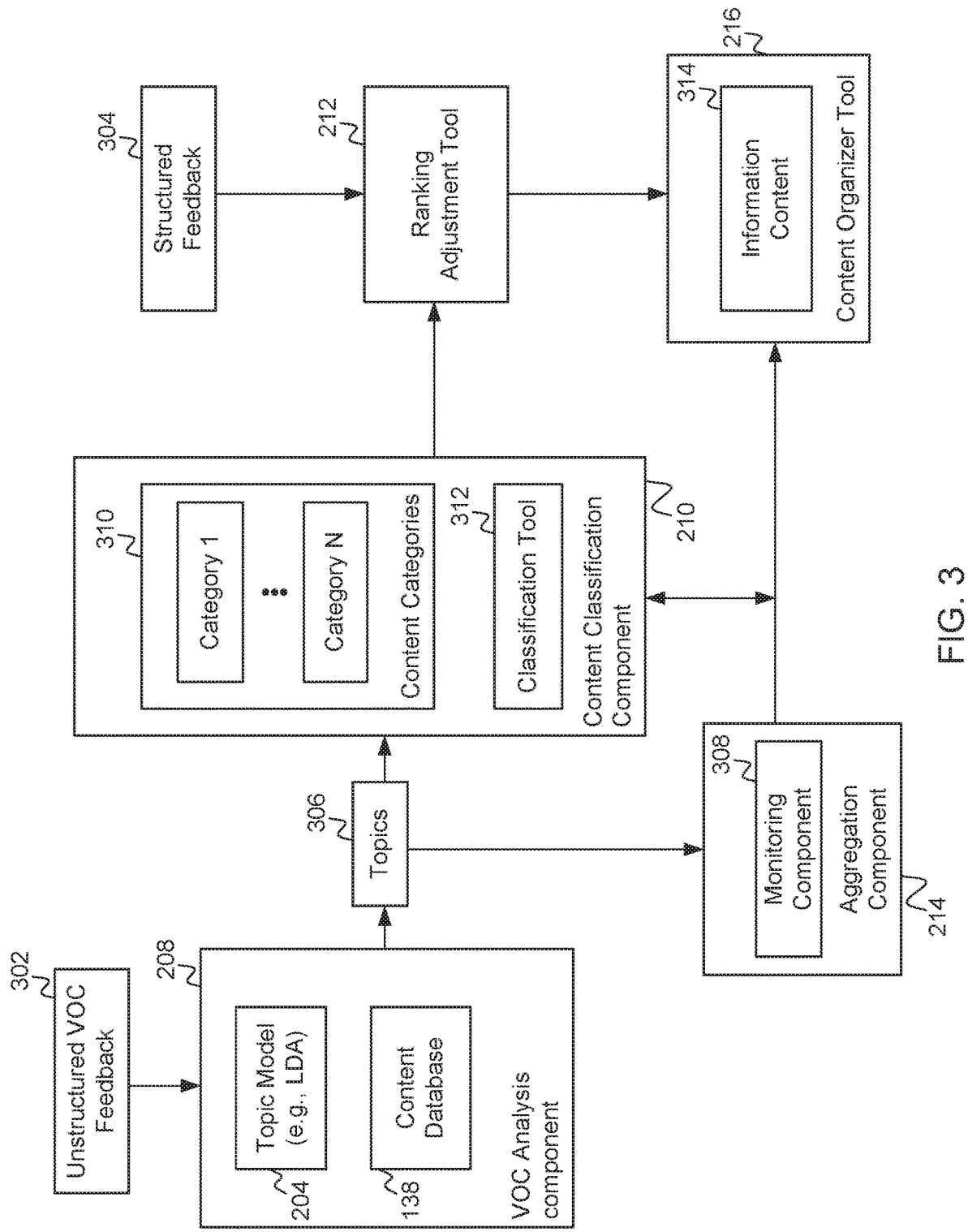
FIG. 3 illustrates an example of integrating structured and unstructured voice-of-customer feedback to adjust rankings of information content, according to one embodiment.

FIG. 3 further illustrates components of the interactive computing service 130 described relative to FIG. 2, according to one embodiment. As shown, the VOC analysis component 208 includes an LDA topic model 204 generated from content database 138. The VOC analysis component 208 receives unstructured VOC feedback (e.g., unstructured text content) 302 and identifies a set of topics 306 determined to be present in the feedback 302 along with related metadata about each identified topic. In one embodiment, the metadata identifies what percentage of the feedback is attributable to or associated with a given topic.

The topics 306 (including metadata about each identified topic) is passed to the content classification component 210, which includes content categories 310 and classification tool 312. The classification tool 312 can separate the topics 306 into one or more of the categories 1 to N, based on the metadata. That is, for a given topic, the classification tool 312 may determine (e.g., based on the metadata) that the topic has a higher probability of belonging to one category as opposed to another category.

The ranking adjustment tool 212 uses the feedback in the content categories 310 to evaluate the structured feedback 304. That is, the ranking adjustment tool 212 can determine whether a measure of user sentiment provided via the structured feedback is accurate based on the feedback content categories that relate to quality or usefulness of the information content presented to the user. As noted, the ranking adjustment tool 212 determines if the ranking of the information content should be adjusted, and if so, determines whether to increase or decrease the ranking based on sentiment for that content determined from the integrated structured feedback and unstructured VOC feedback. Provided that the ranking of the information content is adjusted, the content organizer tool 216 can modify the presentation of the information content 314 for other users using the online service.

Alternatively, in some embodiments, the aggregation tool uses the monitoring component 308 to monitor the set of topics 306 for "trending" topics. Provided the monitoring component 308 does identify one or more "trending" topics, these topics can be passed to the content organizer tool 216. The content organizer tool 216 can identify and present modified information content 314 based on the trending topics and/or based on adjusted rankings of other information content.

Figure 4:
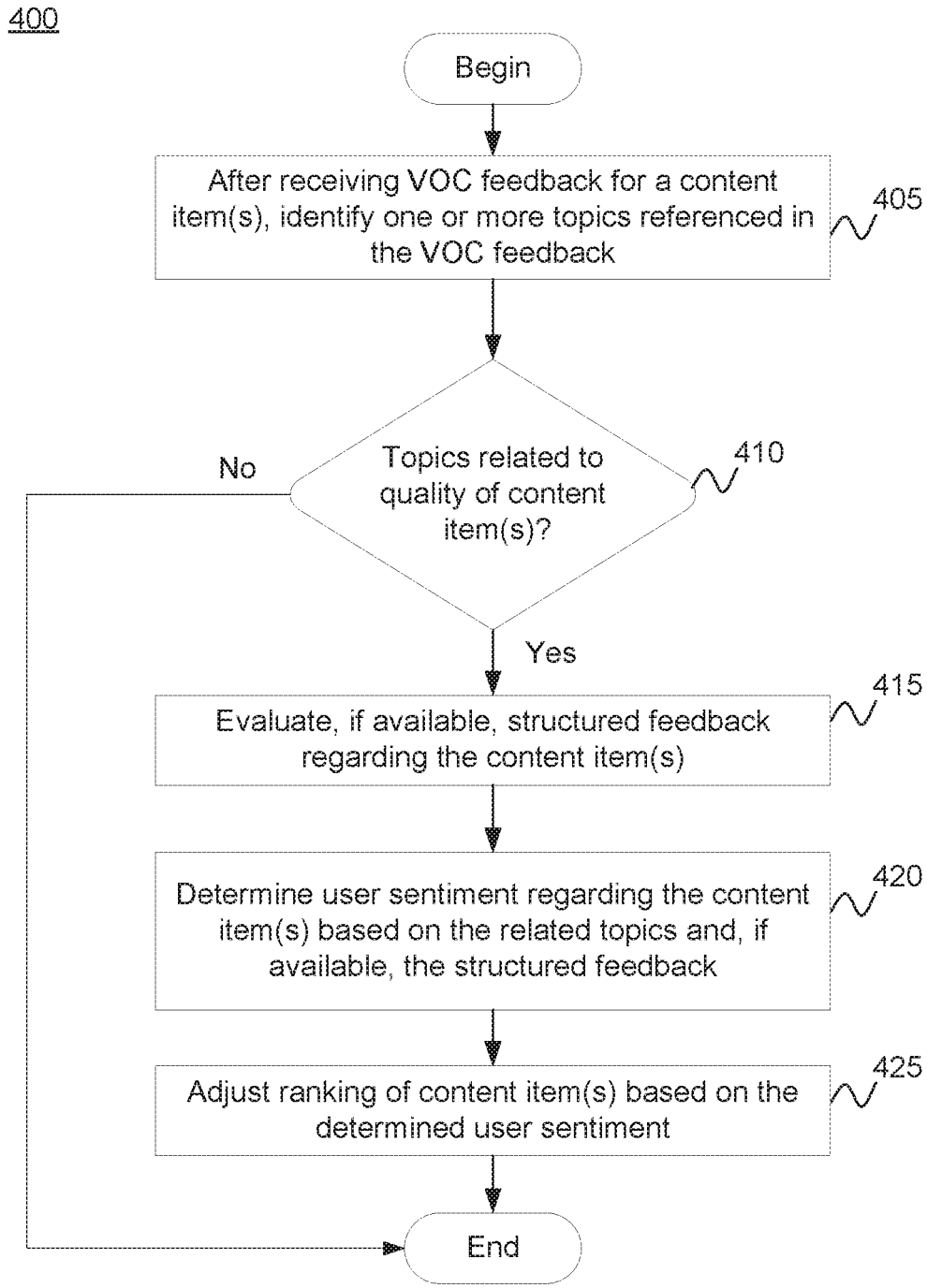
FIG. 4 illustrates a method for adjusting the ranking of information content based on voice-of-customer feedback, according to one embodiment.

FIG. 4 illustrates a method 400 for adjusting a ranking of information content based on voice-of-customer feedback, according to one embodiment. As shown, the method 400 begins at step 405 where, after receiving voice-of-customer feedback (e.g., unstructured text content) for one or more content items (e.g., such as self-service content), the application (e.g., an online tax-preparation service) identifies one or more topics that are referenced in the VOC feedback. At 410, the application determines whether the identified topics referenced in the feedback are related to quality or usefulness of the content items. That is, the application can determine (e.g., based on the topic model) what topics are referenced in the content items and determine whether those topics are same (or similar) to the topics referenced in the feedback. If so, the application can determine that the topics referenced in the feedback are related to the quality or usefulness of the content items. On the other hand, if no topics are related to the quality of the content items, the method ends. That is, in this situation, the application determines that the topics referenced in the feedback do not relate to topics of the content items. In some cases, this determination of whether topics referenced in the feedback relate to quality or usefulness of the content items may be based on a threshold (or percentage) of how much a given topic referenced in the feedback relates to a topic of the content item. For example, assume that feedback from a user is 10% related to "filing status" and 90% related to another topic unrelated to the content item. In such a case, although the application may determine that the "filing status" topic is also mentioned in the content item, the application may still determine that the feedback is unrelated to the quality or usefulness of the content item (e.g., because 90% of the feedback is unrelated to "filing status").

Otherwise, at step 415, the application may evaluate, if available, structured feedback (e.g., up/down votes, star ratings, etc.) regarding the content items. Such structured feedback may provide a measure of user experience relative to the content item (e.g., whether the user was satisfied or dissatisfied with the content items). However, at the same time, as noted above, structured feedback may not accurately reflect user sentiment regarding information content. For example, users may (intentionally or unintentionally) conflate experience related to quality of the information content with their experience related to other aspects (e.g., such as the online service, or other types of information content not presented) that are unrelated to the quality of the information content presented to the user.

At step 420, the application may determine user sentiment regarding the information content based on the relevant voice-of-customer feedback (e.g., topics related to the quality of the content items) and, if available, the structured feedback. For example, the application can determine user sentiment regarding the content item by evaluating the unstructured text content (e.g., using natural language processing) and/or additional structured feedback providing an indication of user experience relative to the content item. In some cases, the structured feedback may substantially improve the measurement of user sentiment regarding the user's experience with the online service. For example, instead of guessing based on the topics associated with the feedback and other analysis (e.g., natural language processing) of the feedback whether the user approves or disapproves of the content items, the structured feedback regarding the content items may be more direct (e.g., a 1-star or no vote, etc.).

At step 425, the application adjusts the ranking of the content items based on the determined user sentiment. Once adjusted, the modified ranking may increase (or decrease) the likelihood of the content items being presented to other users and/or where the content items appear in a list of search results returned to other users. As such, using unstructured voice-of-customer feedback to improve ranking and/or presentation of information content can substantially improve the performance of the online service (e.g., by influencing the relevancy of information content presented to users), and improve the overall experience of other users that use the online service.

Figure 5:
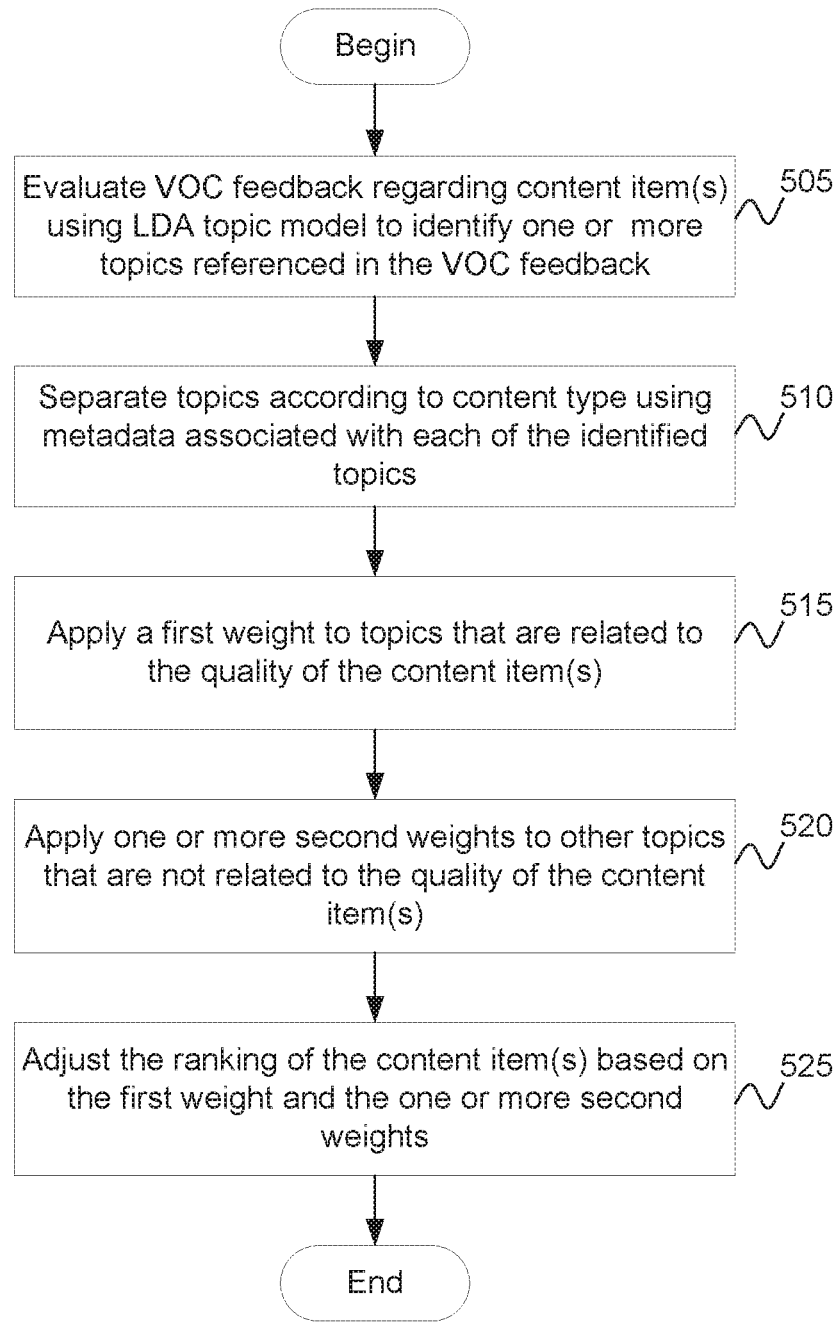
FIG. 5 illustrates a method for adjusting the ranking of information content based on topics referenced in voice-of-customer feedback, according to one embodiment.

FIG. 5 illustrates a method 500 for adjusting the ranking of information content based on topics referenced in voice-of-customer feedback, according to one embodiment. As shown, the method 500 begins at step 505 where the application (e.g., an online tax-preparation service) evaluates voice-of-customer feedback regarding one or more content items using a probabilistic topic model (e.g., an LDA topic model, a CTM, etc.) to identify one or more topics referenced in the voice-of-customer feedback. At 510, the application classifies (or separates) the topics according to their content type using metadata associated with each of the identified topics. That is, as noted above, the application determines if the topics of the feedback are related to the topics or content of the content items presented to the user. To do so, the application uses the topic model to determine what topics are referenced in the content items, and what topics are referenced in the feedback.

The application can adjust the impact that each topic has on the ranking of the content items based on how related the topic is to the quality or usefulness of the content items. For example, at 515, the application applies a first weight to topics that are related to the quality or usefulness of the information content, and, at 520, applies one or more second weights to other topics that are not related to the quality of the information content. Each of the one or more second weights may have a lower value than the first weight because they are not related to the quality of the information content. In some embodiments, one or more of the second weights may have a value of zero (e.g., meaning the application does not consider that respective topic at all when ranking the information content). At 525, the application adjusts the ranking of the content items based on the first weight and the one or more second weights.

Figure 6:
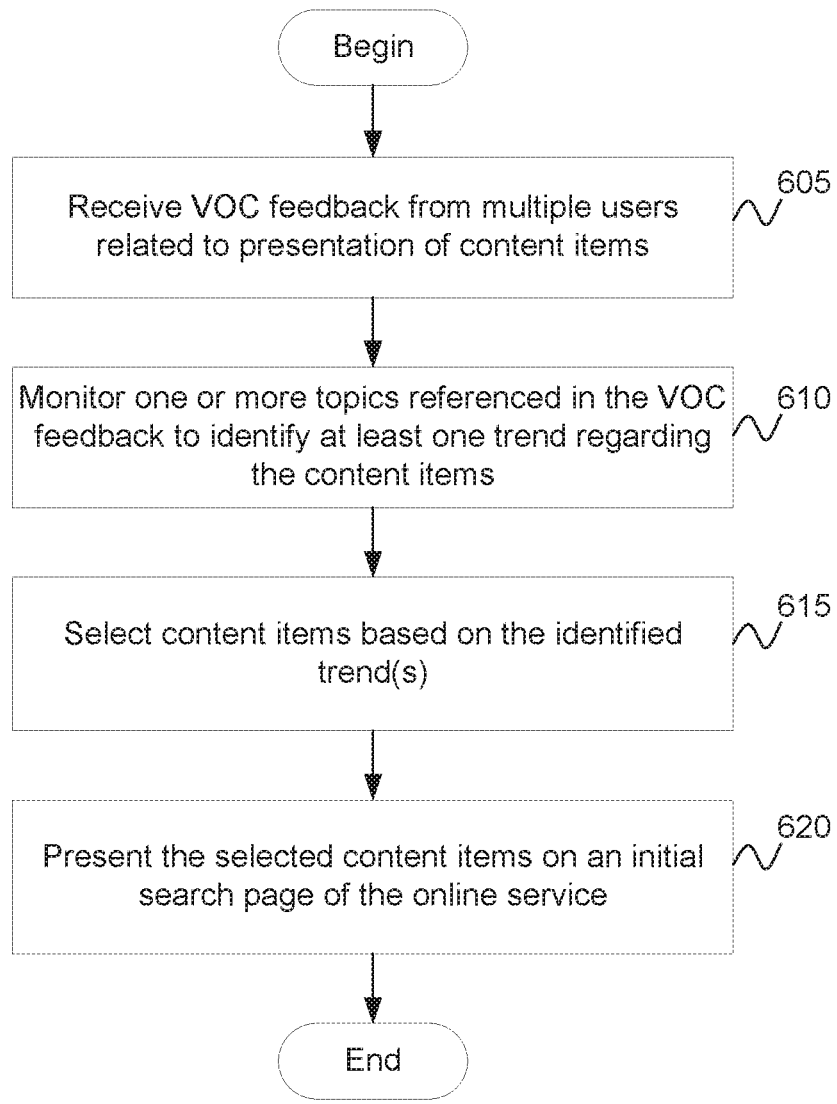
FIG. 6 illustrates a method for identifying topics that may be of interest by users of an online service, based on voice-of-customer feedback, according to one embodiment.

FIG. 6 illustrates a method for identifying "trending" topics that may be of interest to users of an online service, according to one embodiment. As shown, the method 600 begins at step 605 where the application (e.g., online tax-preparation service) receives voice-of-customer feedback from multiple users related to presentation of one or more content items.

At step 610, the application monitors for one or more topics referenced in the voice-of-customer feedback to identify at least one trend regarding the information content. For example, the application may observe that one or more topics relate to particular information content that multiple users are seeking, whether particular information content is unhelpful, etc. At 615, the application uses the identified "trending" topics to select other content items. For example, if the application determines that multiple users are requesting the same or similar information content relating to tax extensions, the application can identify documents and/or other self-support content that includes information related to tax extensions. At 620, the application presents the selected content items so that the items are readily accessible to multiple users of the online service. For example, the application can present the selected content items on an initial home page of the online service.

Figure 7:
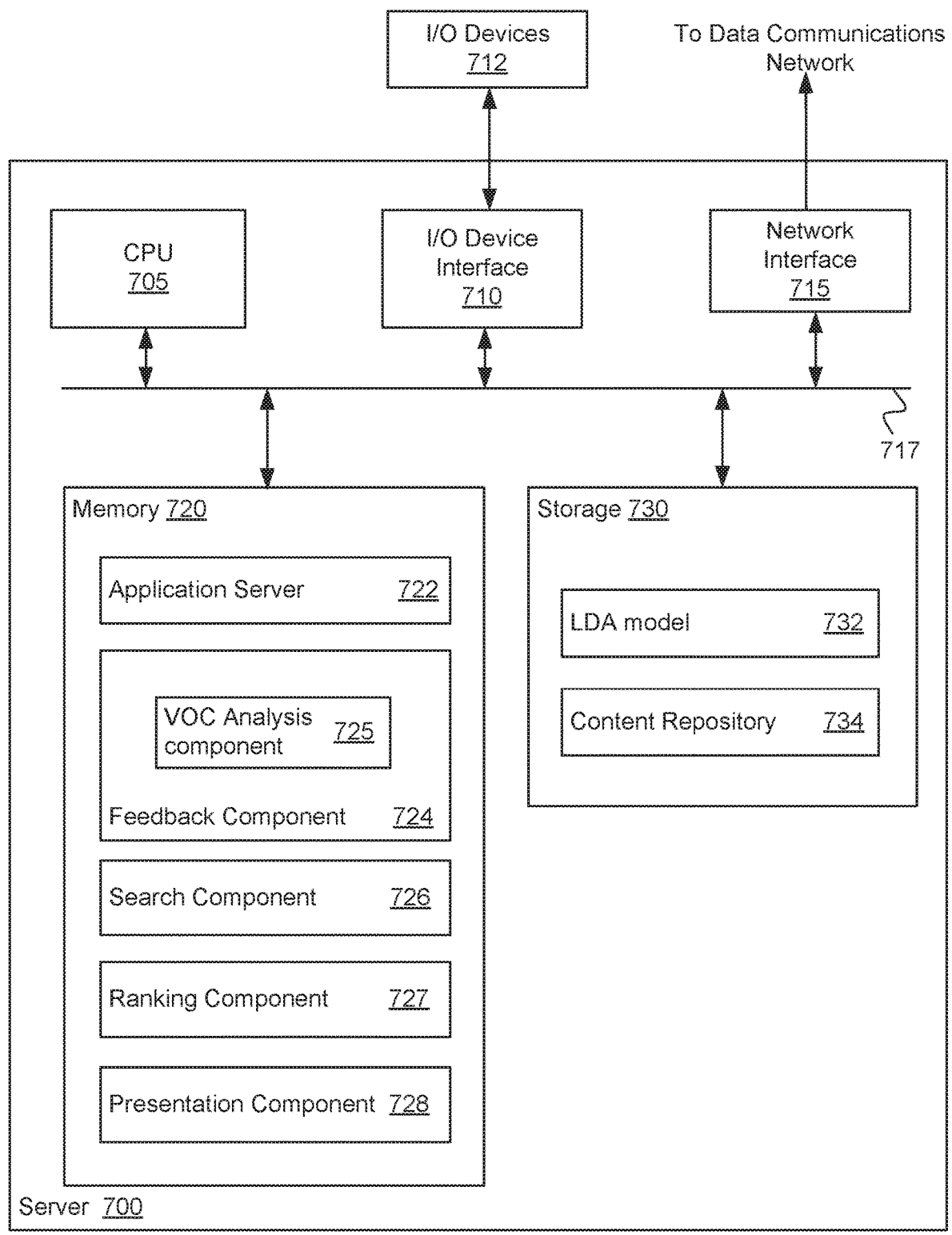
FIG. 7 illustrates an example computing system used to adjust rankings of information content based on voice-of-customer feedback, according to one embodiment.

FIG. 7 illustrates an example computing system 700 used to adjust rankings of information content based on voice-of-customer feedback, according to one embodiment. As shown, the computing system 700 includes, without limitation, a central processing unit (CPU) 705, a network interface 715, a memory 720, and storage 730, each connected to a bus 717. The computing system 700 may also include an I/O device interface 710 connecting I/O devices 712 (e.g., keyboard, display and mouse devices) to the computing system 700. Further, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stored in the storage 730. The bus 717 is used to transmit programming instructions and application data between the CPU 705, I/O device interface 710, storage 730, network interface 715, and memory 720. Note, CPU 705 is included to be representative of a single CPU, multiple CPUs, a single CPU having multiple processing cores, and the like, and the memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes an application server 722, a feedback component 724, a search component 726, a ranking component 727, and a presentation component 728. Storage 730 includes an LDA topic model 732 and a content repository 734. Storage 730 may also include other topic models, such as a CTM. As described, the application server 722 provides the underlying logic and functionality for an application accessed by users, e.g., an online interactive tax-preparation service. The application server 722 may also provide users with access to content and features associated with the online interactive service, such as the hosting of online communities or forums where users can post and respond to questions, topics, and comments about the application or online service. The search component 726 may be used to search for content in the content repository 734 (e.g., search the question/answer exchange forum of an online community) as well as to search for service documentation regarding features or workflows supported by the online interactive service. As noted, users may compose a search query by specifying a set of keywords or phrases.

Feedback component 724 may be used to capture feedback regarding user experience. For example, the feedback component 724 may prompt the user for structured and/or unstructured feedback regarding the quality and/or usefulness of the information content. The feedback component may use the VOC analysis component 725 to evaluate unstructured voice-of-customer feedback. As described, the VOC analysis component 725 may use LDA topic model 732 to identify topics referenced by the voice-of-customer feedback and associated topic metadata.

Ranking component 727 may be used to determine user sentiment regarding the user's experience with an online service, and adjust ranking of information content based on the determined user sentiment. As noted, the ranking component 727 can integrate structured and unstructured feedback to remove potential bias that may be present in voice-of-customer feedback. The ranking component 727 can weight (or adjust the impact of) topics referenced in voice-of-customer feedback differently depending on a measure of how much the topic relates to quality of the information content.

The presentation component 728 may be used to modify information content based on adjusted ranking. Alternatively, or additionally, the presentation component 728 can identify "trending" topics that may be of interest to users of the online service and select and present information content such that information regarding the "trending" topics is presented to users of the online service.

Advantageously, adjusting rankings of information content and/or presenting information content based on voice-of-customer feedback improves the performance of the online service and the quality of users' experience when searching for information content provided by the online service.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for adjusting a ranking of information content of a software application having a content repository associated therewith and presented to a user based on voice-of-customer feedback, comprising:
   receiving feedback regarding a content item selected from the content repository and presented to a user, the feedback including unstructured text content and structured feedback, the unstructured text content having at least one topic, each topic of the unstructured text content having a respective content type, and the structured feedback having a topic corresponding to a topic of the content item and a content type corresponding to a content type of the content item;
   identifying, based on a probabilistic topic model generated from the content repository, at least one topic referenced in the unstructured text content;
   determining, for each respective identified topic of the at least one identified topic, using metadata associated with the respective identified topic, a content type associated with the respective identified topic;
   determining, for each respective identified topic of the at least one identified topic, whether the respective identified topic is related to a quality of the content item and whether the content type of the respective identified topic matches the content type of the content item;
   for each identified topic of the at least one identified topic for which is it determined that the identified topic is related to the quality of the content item and that the content type of the identified topic matches the content type of the content item, applying a first weight to the structured feedback;
   for each identified topic of the at least one identified topic for which it is determined that the identified topic is not related to the quality of the content item or that the content type of the identified topic does not match the content type of the content item, applying a weight of a one or more second weights having a value less than the first weight to the structured feedback;
   ranking the content item based on the structured feedback, the first weight, and the one or more second weights; and
   presenting on a user interface of another user a selection of search results that include the content item, wherein a position of the content item within the selection of search results is based on the ranking of the content item.

2. The computer-implemented method of claim 1, wherein the structured feedback provides an indication of an experience of the user relative to the content item.

3. The computer-implemented method of claim 2, wherein the structured feedback comprises either an up vote or a down vote or a star rating that indicates whether the user approves or disapproves of the content item.

4. The computer-implemented method of claim 1, wherein the unstructured text content is evaluated using natural language processing.

5. The computer-implemented method of claim 1, further comprising:
   evaluating feedback from a plurality of other users regarding content items associated with a first topic of the at least one topic referenced in the unstructured text content;
   identifying the first topic of the at least one topic as a trending topic based on the feedback from the plurality of other users;
   selecting content items regarding the trending topic; and
   presenting the selected content items regarding the trending topic to users.

6. The computer-implemented method of claim 1, wherein the probabilistic topic model is a Latent Dirichlet Allocation (LDA) model or a correlated topics model (CTM).

7. The computer-implemented method of claim 1, wherein the respective content type of each topic of the unstructured text content and the content type of the content item are selected from a group comprising: self-support content, assisted support content, product related content, application content, and service content.

8. A system, comprising:
   one or more processors; and
   a memory comprising instructions that, when executed on the one or more processors, cause the system to perform a method for adjusting a ranking of information content of a software application having a content repository associated therewith and presented to a user based on voice-of-customer feedback, the method comprising:
      receiving feedback regarding a content item selected from the content repository and presented to a user, the feedback including unstructured text content and structured feedback, the unstructured text content having at least one topic, each topic of the unstructured text content having a respective content type, and the structured feedback having a topic corresponding to a topic of the content item and a content type corresponding to a content type of the content item;
      identifying, based on a probabilistic topic model generated from the content repository, at least one topic referenced in the unstructured text content;
      determining, for each respective identified topic of the at least one identified topic, using metadata associated with the respective identified topic, a content type associated with the respective identified topic;

determining, for each respective identified topic of the at least one identified topic, whether the respective identified topic is related to a quality of the content item and whether the content type of the respective identified topic matches the content type of the content item;

for each identified topic of the at least one identified topic for which is it determined that the identified topic is related to the quality of the content item and that the content type of the identified topic matches the content type of the content item, applying a first weight to the structured feedback;

for each identified topic of the at least one identified topic for which it is determined that the identified topic is not related to the quality of the content item or that the content type of the identified topic does not match the content type of the content item, applying a weight of a one or more second weights having a value less than the first weight to the structured feedback;

for each identified topic for which it is determined that the content type of the identified topic ranking the content item based on the structured feedback, the first weight, and the one or more second weights; and presenting on a user interface of another user a selection of search results that include the content item, wherein a position of the content item within the selection of search results is based on the ranking of the content item.

9. The system of claim 8, wherein the structured feedback provides an indication of an experience of the user relative to the content item.

10. The system of claim 9, wherein the structured feedback comprises either an up vote or a down vote or a star rating that indicates whether the user approves or disapproves of the content item.

11. The system of claim 8, wherein the unstructured text content is evaluated using natural language processing.

12. The system of claim 8, wherein the method further comprises:

evaluating feedback from a plurality of other users regarding content items associated with a first topic of the at least one topic referenced in the unstructured text content;

identifying the first topic of the at least one topic as a trending topic based on the feedback from the plurality of other users;

selecting content items regarding the trending topic; and presenting the selected content items regarding the trending topic to users.

13. The system of claim 8, wherein the probabilistic topic model is a Latent Dirichlet Allocation (LDA) model or a correlated topics model (CTM).

14. The system of claim 9, wherein the respective content type of each topic of the unstructured text content and the content type of the content item are selected from a group comprising: self-support content, assisted support content, product related content, application content, and service content.

15. A computer-implemented method for adjusting a ranking of information content of a software application having a content repository associated therewith and presented to a user based on voice-of-customer feedback, comprising:

receiving feedback comprising a comment, a review, or a survey regarding a content item presented to a user, the feedback including unstructured text content and structured feedback, the unstructured text content having at least one topic, each topic of the unstructured text content having a respective content type, and the structured feedback having a topic corresponding to a topic of the content item and a content type corresponding to a content type of the content item;

identifying, based on a probabilistic topic model generated from the content repository, at least one topic referenced in the unstructured text content;

determining, for each respective identified topic of the at least one identified topic, using metadata associated with the respective identified topic, a content type associated with the respective identified topic;

determining, for each respective identified topic of the at least one identified topic, whether the respective identified topic is related to a quality of the content item and whether the content type of the respective identified topic matches the content type of the content item;

for each identified topic of the at least one identified topic for which is it determined that the identified topic is related to the quality of the content item and that the content type of the identified topic matches the content type of the content item, applying a first weight to the structured feedback;

for each identified topic of the at least one identified topic for which it is determined that the identified topic is not related to the quality of the content item or that the content type of the identified topic does not match the content type of the content item, applying a weight of a one or more second weights having a value less than the first weight to the structured feedback;

for each identified topic for which it is determined that the content type of the identified topic ranking the content item based on the structured feedback, the first weight, and the one or more second weights; and presenting on a user interface of another user a selection of search results that include the content item, wherein a position of the content item within the selection of search results is based on the ranking of the content item.

16. The computer-implemented method of claim 15, wherein the structured feedback provides an indication of an experience of the user relative to the content item.

17. The computer-implemented method of claim 16, wherein the structured feedback comprises either an up vote or a down vote or a star rating that indicates whether the user approves or disapproves of the content item.

18. The computer-implemented method of claim 15, wherein the unstructured text content is evaluated using natural language processing.

19. The computer-implemented method of claim 15, further comprising:

evaluating feedback from a plurality of other users regarding content items associated with a first topic of the at least one topic referenced in the unstructured text content;

identifying the first topic of the at least one topic as a trending topic based on the feedback from the plurality of other users;

selecting content items regarding the trending topic; and presenting the selected content items regarding the trending topic to users.

20. The computer-implemented method of claim 15, wherein the respective content type of each topic of the unstructured text content and the content type of the content item are selected from a group comprising: self-support content, assisted support content, product related content, application content, and service content.

\* \* \* \* \*